J. L. JOHNSON.
INDUCTION MOTOR.
APPLICATION FILED FEB. 14, 1910.
1,002,850.
Patented Sept. 12, 1911.
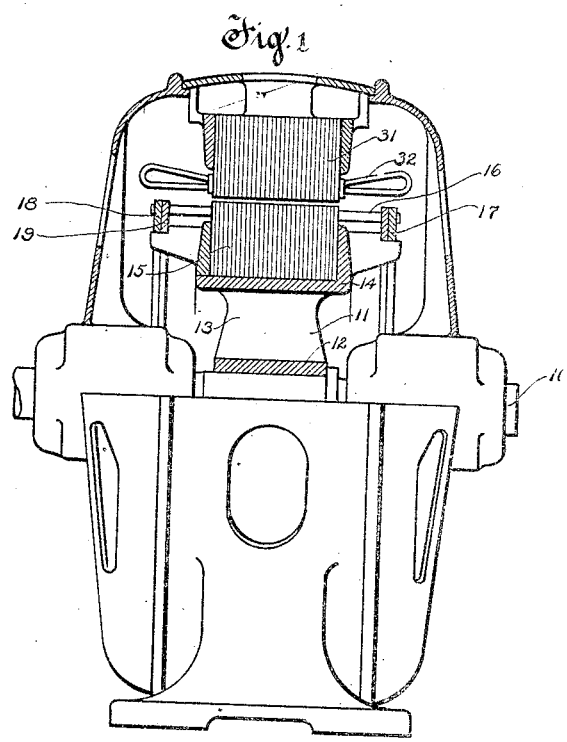
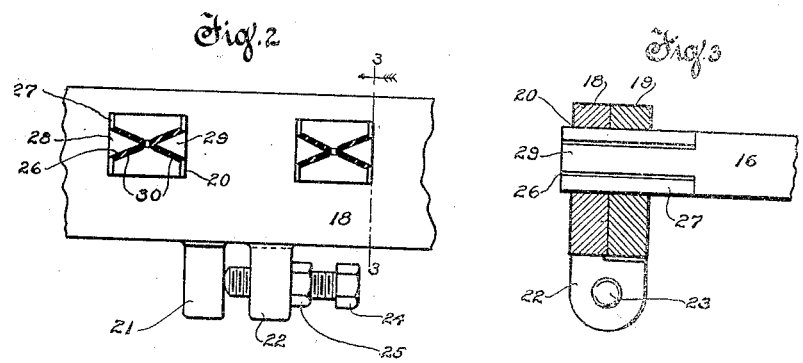
Witnesses
Rob. E. Stoll
Chas. L. Byron
Inventor
John L. Johnson
By Chas. E. Lord
Attorney

UNITED STATES PATENT OFFICE.

JOHN L. JOHNSON, OF MILWAUKEE, WISCONSIN, ASSIGNOR TO ALLIS-CHALMERS COMPANY, A CORPORATION OF NEW JERSEY.

INDUCTION-MOTOR.

1,002,850.  Specification of Letters Patent.  Patented Sept. 12, 1911.

Application filed February 14, 1910. Serial No. 543,876.

*To all whom it may concern:*

Be it known that I, JOHN L. JOHNSON, a citizen of the United States, residing at Milwaukee, in the county of Milwaukee and State of Wisconsin, have invented certain new and useful Improvements in Induction-Motors, of which the following is a full, clear, and exact specification.

My invention relates to induction motors and more particularly to means for connecting the rotor bars to short-circuiting rings of rotors having squirrel cage windings.

The object of my invention is to provide a connection for the conducting bars and short-circuiting rings which will be inexpensive, simple and effective, and which will permit parts of the rotor to be assembled more easily and quickly than heretofore.

In carrying out my invention I connect the rotor bars to short-circuiting members, which by a relative movement cause the rotor bars to be wedged in said short-circuiting members, effecting good electrical connections.

My invention further consists in certain novel details of construction and combination and arrangement of parts to be described in the specification and particularly pointed out in the appended claims.

In the accompanying sheet of drawings, Figure 1 is a longitudinal elevation, partly in section, of a squirrel cage induction motor embodying my invention. Fig. 2 is an enlarged fragmentary side view of a short-circuiting ring equipped with my invention; and Fig. 3 is a sectional view taken substantially along the line 3—3 of Fig. 2.

Upon the shaft 10 of a squirrel cage induction motor is mounted a spider 11 which consists essentially in a hub 12, radial arms 13 and rim 14 on which is mounted a laminated core 15. The core is provided with the usual slots in which are mounted bars 16, which extend beyond each side of the core in the usual manner. The ends of the conductor bars on each side of the machine are connected together by a short-circuiting ring 17. The rings in this particular case comprise a plurality of annular members 18 and 19 respectively, which are located adjacent each other or in juxtaposition and are in electrical contact. These adjacent annular members are provided with a plurality of sets of openings 20 the holes of each set registering with each other for the reception of the rotor bars.

Various means may be employed for the purpose of producing a relative circumferential adjustment of the members 18 and 19 of each short-circuiting ring, but I prefer to employ a construction in which each of the annular short-circuiting members is provided with an inwardly extending lug, designated as 21 on member 19 and as 22 on member 18 respectively. These lugs occur in pairs, overlap each other, and are circumferentially spaced. One of the lugs 22 is provided with a tapped portion 23 which receives a screw 24, the end of which screw engages the overlapping lug 21 of the adjacent short-circuiting annular member. The screw 24 is provided with a lock-nut 25 for securing the annular short-circuiting members in any desired relative position.

The ends of the rotor bars are provided with cross-cut slots or grooves 26. The corners of the ends of the rotor bars are cut away forming grooved portions 27. With this arrangement portions 28 and 29 of the rotor bars formed by the cross cuts, extend slightly beyond the other portions of said bars. When the rings are forced onto the rotor bars so that the openings 20 receive the said bars the latter engage the rings tightly. The cross cut grooves 26 of the rotor conductors may be provided with some yieldable material 30, such as asbestos, or similar substance springing the rotor bars and retaining them in practically perfect electrical connection with the short-circuiting rings. The screw 24 is then forced through the threaded portion 23 of the lug 22 so that the end of the screw engages the overlapping lug 21 of the adjacent annular member on the short-circuiting ring. This screw may be drawn up causing a relative motion between the annular short-circuiting members 18 and 19 in such a manner as to clamp tightly the rotor bars in the short-circuiting rings. It is seen that the projecting portions 28 and 29 of the ends of the rotor bars will be pressed tightly against the sides of the openings 20 in the short-circuiting rings causing effective and efficient connections between the short-circuiting rings and the rotor bars. The desired degree of tightness and rigidity between the connections of the short-circuiting rings and the bars may be made to vary at will by adjusting the screw 24 and when the proper degree of tightness is reached the annular members may be firmly held in position by the lock-nut 25.

Surrounding the rotor is a stator, which is provided with a laminated core 31 provided with the usual alternating current winding or windings having end turns 32 which extend beyond the core in the usual manner. The rotor construction is simple, inexpensive and effective and may be applied to machines of any size.

It is evident that there may be many modifications of the precise form herein shown and described, and I aim in my claims to cover all such modifications of the invention which do not involve a departure from the spirit and scope of same.

What I claim as new is:

1. In an induction motor, a rotor having a plurality of conductor bars, a conducting ring comprising a plurality of independently movable annular members for clamping the bars between said members when one of said members is moved, and means for regulating the effective clamping of said bars.

2. In an induction motor, a squirrel cage rotor having a plurality of conductor bars, a conducting ring comprising a plurality of annular members at each end of the rotor for short-circuiting the bars, and means for causing a relative motion between said annular members to wedge said bars.

3. In an induction motor, a squirrel cage rotor having a plurality of conducting bars provided with slotted or grooved end portions, conducting rings comprising a plurality of members at each end of the rotor for short-circuiting the bars, yieldable material located in the slotted or grooved end portions of said bars, and means located on said members for causing a relative motion between said members to wedge said bars.

4. In an induction motor, a squirrel cage rotor having a plurality of conducting bars, a conducting ring comprising a plurality of members at each end of the rotor for short-circuiting the bars, lugs mounted on said members and occurring in pairs, and means engaging said lugs for causing a relative movement of said members to clamp said bars in said short-circuiting rings.

5. In an induction motor, a rotor having a plurality of conductor bars, a conducting ring comprising a plurality of members having overlapping lug portions and located at each end of the rotor for short-circuiting the bars, screws engaging said lugs to cause a relative movement between said members to clamp said bars in said short-circuiting rings, and means for locking said screws to retain said members in any desired position.

6. In an induction motor, a squirrel cage rotor having a plurality of conducting bars, a conducting ring comprising a plurality of members in juxtaposition at each end of the rotor for short-circuiting the bars, said members being provided with radially extending integral projections, means engaging said projections for causing a relative movement of said members to clamp said bars in said short-circuiting rings.

7. In an induction motor, a squirrel cage rotor having a plurality of conducting bars, a conducting ring comprising a plurality of annular members provided with registering openings and located at one end of the rotor for short circuiting the bars, and means cooperating to cause a relative movement of said members to clamp said bars in the openings of said short-circuiting rings.

8. In an induction motor, a squirrel cage rotor having a plurality of conducting bars provided with slotted end portions, a short-circuiting ring comprising a plurality of adjacent annular members having registering holes for the reception of said bars, yieldable material located in said slotted portions, and means for causing a relative movement between said annular members for clamping said bars in said short-circuiting rings.

9. In an induction motor, a rotor having a plurality of conducting bars, and a short-circuiting ring engaging said bars and having relative movable adjustable parts for clamping said bars.

10. In an induction motor, a rotor having a plurality of conducting bars, and a short-circuiting ring engaging said bars and having circumferentially movable parts for clamping said bars.

11. In an induction motor, a rotor having a plurality of conducting bars with resilient end portions, and a short-circuiting ring engaging at all times said end portions and having relatively movable parts for clamping said bars.

12. In an induction motor, a rotor having a plurality of conducting bars with resilient end portions, and a short-circuiting ring engaging said end portions and having circumferentially adjustable parts for clamping said bars.

13. In an induction motor, a rotor having a plurality of conducting bars with resilient end portions, and a short-circuiting ring engaging at all times said end portions and having a plurality of parts, one of said parts being adjustable.

14. In an induction motor, a rotor having a plurality of conducting bars with resilient end portions, and a short-circuiting ring engaging said end portions and having relatively movable parts for clamping simultaneously all of said conducting bars.

15. In an induction motor, a rotor having a plurality of conducting bars with resilient end portions, and a short-circuiting ring engaging said end portions and having circumferentially adjustable parts for clamping simultaneously all of said conducting bars.

16. In an induction motor, a rotor having a plurality of conducting bars with slots or grooves in the ends thereof, and a short-circuiting ring engaging the slotted or grooved ends of said bars and having relatively movable parts clamping said conducting bars.

17. In an induction motor, a rotor having a plurality of conducting bars with slotted or grooved portions, and a short-circuiting ring engaging said slotted or grooved portions and having circumferentially adjustable parts for simultaneously clamping all of said conducting bars.

18. In an induction motor, a rotor having a plurality of conducting bars, and a short-circuiting ring engaging said bars and having relatively movable and adjustable parts for clamping simultaneously all of said bars.

19. In an induction motor, a rotor having a plurality of conducting bars, a short-circuiting ring engaging said bars and having relatively movable parts for clamping simultaneously all of said bars, and means for adjusting the effective clamping action of said relatively movable parts.

Milwaukee, Wisconsin, February 2, 1910.

In testimony whereof I affix my signature, in the presence of two witnesses.

JOHN L. JOHNSON.

Witnesses:
  CHAS. L. BYRON,
  ROB. E. STOLL.